(Model.)

G. N. SAEGMULLER.
Solar Transit.

No. 240,849.  Patented May 3, 1881.

Attest.
Sidney P. Hollingsworth
Walter S. Dodge

Inventor.
G. N. Saegmuller
By Dodge & Son
Attys

UNITED STATES PATENT OFFICE.

GEORGE N. SAEGMULLER, OF WASHINGTON, DISTRICT OF COLUMBIA.

SOLAR TRANSIT.

SPECIFICATION forming part of Letters Patent No. 240,849, dated May 3, 1881.

Application filed February 28, 1881. (Model.)

*To all whom it may concern:*

Be it known that I, GEORGE N. SAEGMULLER, of Washington, in the county of Washington and District of Columbia, have invented certain Improvements in Solar Transits, of which the following is a specification.

My invention relates to an improved attachment for surveyors' transits, designed to take the place of the attachments now in general use, designed for the purpose of simplifying the construction and method of using the instruments, and of giving a higher degree of accuracy.

In solar attachments as hitherto constructed a vertical graduated arc has been usually mounted above the telescope of the transit on a perpendicular axis, and provided with a radius bar or plate having lenses and eye-pieces at its two ends. These attachments are expensive in construction, exceedingly difficult of adjustment, and far less accurate in their readings than the instrument to which they are attached, thus impairing the accuracy and efficiency of the entire instrument.

My improvement consists in applying to an ordinary transit, having a telescope and a vertical graduated arc, a second telescope mounted upon an axis perpendicular to the main telescope, and provided with a level, by which its parallelism of the two telescopes may be readily and accurately determined before commencing operations, after which a quick and simple adjustment of the two telescopes independently will cause the vertical arc of the main telescope to indicate the angles of divergence between the two.

Figure 1:
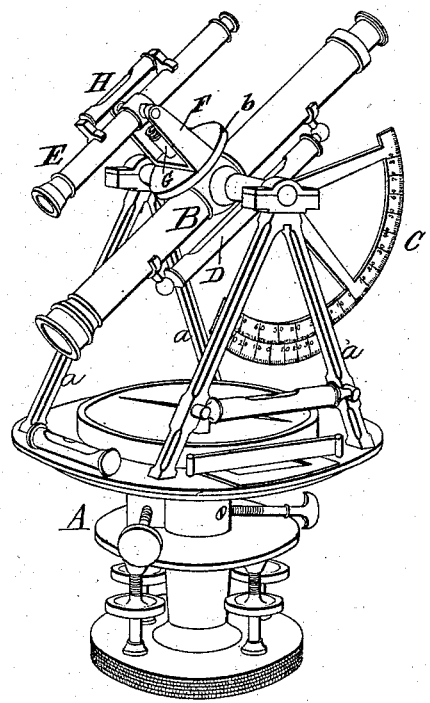
Figure 2:
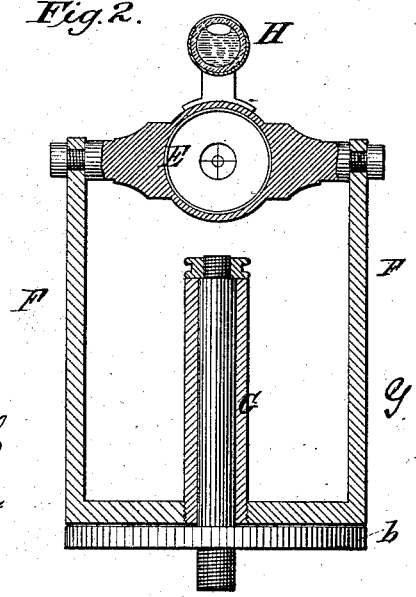

Figure 1 represents a perspective view of an ordinary transit provided with my improved attachment. Fig. 2 represents a vertical cross-section of the attachment.

A represents the base of the transit, the top plate of which has a rotary motion in a horizontal plane, said top plate supporting the standards $a$, which in turn support the horizontal axis of the main telescope B. This telescope, which swings in a vertical plane upon its trunnions, is provided, as usual, with a graduated vertical arc, C, which operates in connection with a plate or index on the standards, to indicate the angles of vertical inclination. This telescope B is also provided, as usual, with a level, D, by which it may be accurately adjusted to a horizontal position.

In the features above described the instrument is of ordinary construction. Upon the main telescope I secure, in perpendicular relation thereto, an axis, G, upon which I mount a plate having upright arms F, which sustain the horizontal trunnions of a second telescope, E, which is provided, as shown, with a level, H, by which to determine its horizontal position.

It will be seen that under the above construction the upper telescope, E, may swing in a vertical plane, and may also be turned horizontally with relation to the main telescope. The base of the frame F may be arranged to move over a graduated horizontal plate, $b$, as shown, if preferred; but this plate, commonly known as the "hour-plate," is not essential to my apparatus, since the time may be read off with the horizontal top plate of the base in connection with the usual graduations thereon, or with special graduations for the purpose.

One of the principal objects of the attachment being to determine vertical angles of divergence, it will be seen that they are readily obtained by first bringing the two telescopes to a horizontal position or parallel with each other by means of their levels. The main telescope being then raised or lowered, the desired amount is read off on the verniers of the standards. The upper telescope is then leveled, while the main telescope remains in position. It will be seen that the two have a vertical angle of divergence equal to that as first set off on the vertical circle. The various uses to which the instrument may be applied need not be described herein, the methods of applying the same being similar to that of using the instrument now in general use. The principal use is to get the meridian, and to this end the following steps are pursued: The two telescopes are first leveled, bringing them parallel with each other. The declination of the sun is then set off in accordance with the nautical almanac on the vertical arc of the main telescope by swinging the latter vertically, which, of course, elevates or depresses both telescopes according as the declination is north or south. The reading of the vertical arc is then noted. The small telescope is then leveled, which, of course, gives between the two telescopes the exact angle of declination—the latitude of the place being now set off on the vertical circle of the instrument, and the vertical axis of small telescope is now pointing to the pole. By turning both telescopes on the vertical axis the image of the sun will be brought in the field of the small telescope. At that instant the large telescope is in the meridian.

The essential feature of my invention consists in combining two vertical swinging telescopes with means for leveling them, and a single vertical arc common to both.

Having thus described my invention, what I claim is—

1. The combination of the two telescopes B and E, one supported by the other, means for leveling them independent of each other, and an indicator to show the angle of vertical inclination.

2. In combination with the telescope B, mounted on horizontal trunnions and provided with the vertical arc C and level D, the second telescope, E, sustained by a perpendicular axis on the first telescope, and provided with a level, H.

3. The solar attachment for a transit-instrument, consisting of a telescope, E, sustained by a horizontal and vertical axis, and provided with a level.

4. In combination with a transit-instrument swinging on a horizontal graduated plate, and provided with a vertical moving telescope having a level and a vertical graduated arc, a second telescope mounted upon the first in such manner as to swing vertically, and provided with a level.

5. The combination of vertically-swinging telescope, a second vertically-swinging telescope mounted upon the first, means for leveling the two telescopes independently, and a vertically-graduated arc or plate connected with one of said telescopes, for indicating its angle of vertical inclination.

G. N. SAEGMULLER.

Witnesses:
SIDNEY P. HOLLINGSWORTH,
WALTER S. DODGE.